United States Patent
Kwon

(10) Patent No.: US 9,091,842 B2
(45) Date of Patent: Jul. 28, 2015

(54) IMAGING LENS

(71) Applicant: LG INNOTEK CO., LTD., Seoul (KR)

(72) Inventor: Dukkeun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 13/935,218

(22) Filed: Jul. 3, 2013

(65) Prior Publication Data

US 2013/0335622 A1 Dec. 19, 2013

Related U.S. Application Data

(63) Continuation of application No. 12/854,428, filed on Aug. 11, 2010, now Pat. No. 8,503,111.

(30) Foreign Application Priority Data

Aug. 11, 2009 (KR) .................. 10-2009-0073715

(51) Int. Cl.
G02B 13/18 (2006.01)
G02B 13/00 (2006.01)
G02B 9/60 (2006.01)

(52) U.S. Cl.
CPC *G02B 13/18* (2013.01); *G02B 9/60* (2013.01); *G02B 13/0045* (2013.01)

(58) Field of Classification Search
CPC ....... G02B 13/18; G02B 13/0045; G02B 9/60
USPC ......................................................... 359/764
See application file for complete search history.

(56) References Cited

U.S. PATENT DOCUMENTS

| | | | |
|---|---|---|---|
| 3,871,749 A | 3/1975 | Harada | |
| 5,299,064 A | 3/1994 | Hamano et al. | |
| 6,259,508 B1 * | 7/2001 | Shigematsu | 355/53 |
| 7,826,151 B2 * | 11/2010 | Tsai | 359/764 |
| 2009/0122423 A1 * | 5/2009 | Park et al. | 359/764 |

* cited by examiner

*Primary Examiner* — Joseph P Martinez
(74) *Attorney, Agent, or Firm* — Saliwanchik, Lloyd & Eisenschenk

(57) ABSTRACT

Disclosed herein is an imaging lens suitable for a camera module using a high resolution imaging sensor, decreasing a flare phenomenon and reducing the sensitivity. The imaging lens comprises, in order from the object side, a first lens having positive (+) refractive force; a second lens having negative (−) refractive force; a third lens having positive (+) refractive force; a fourth lens having positive (+) refractive force; and a fifth lens having negative (−) refractive force, wherein an object side plane of the third lens is convexly formed.

17 Claims, 6 Drawing Sheets

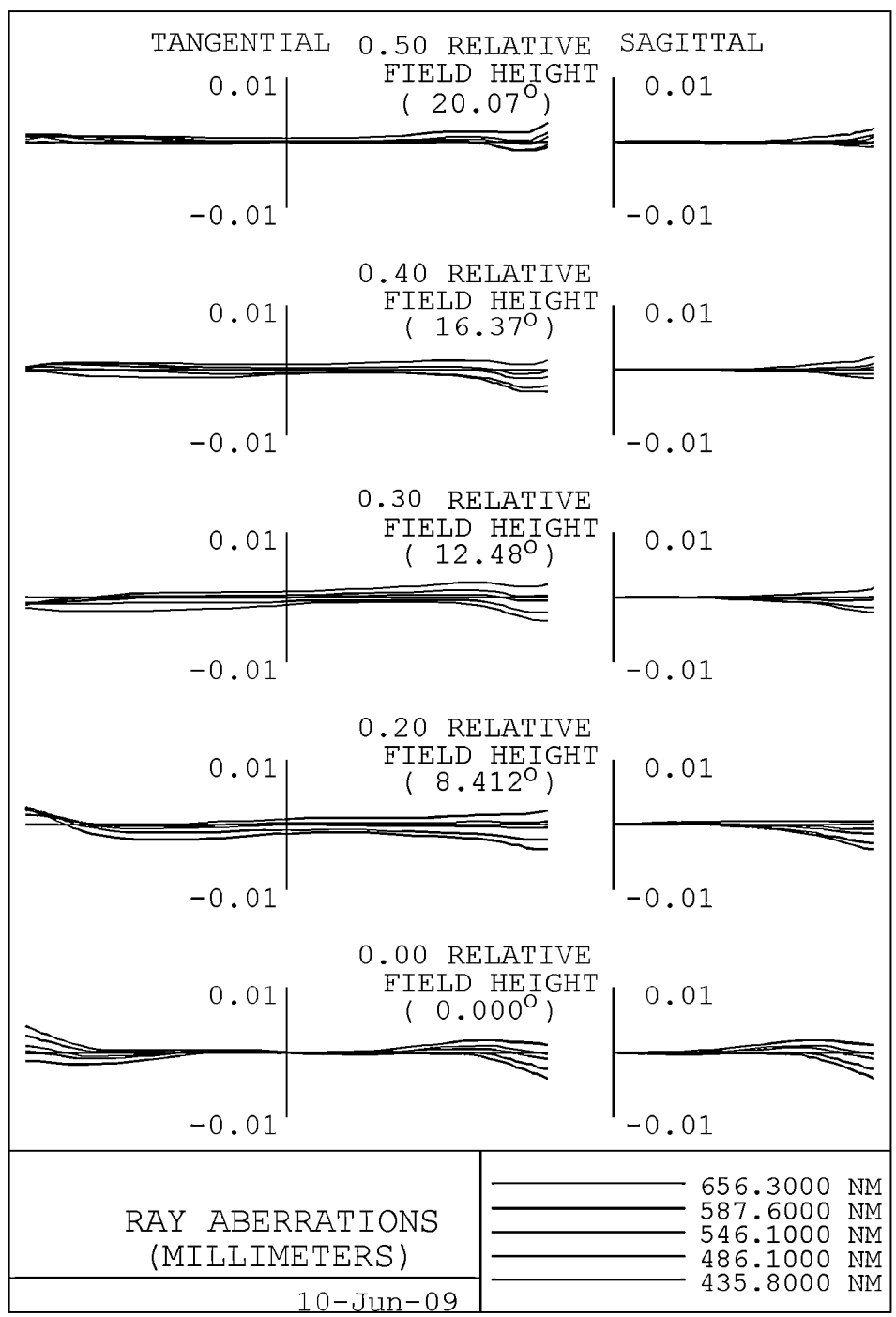

FIG. 5a
FIG. 5b
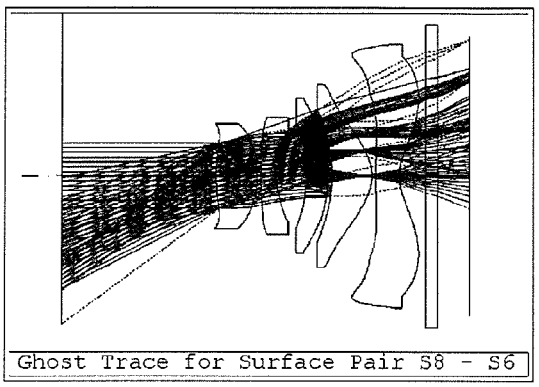
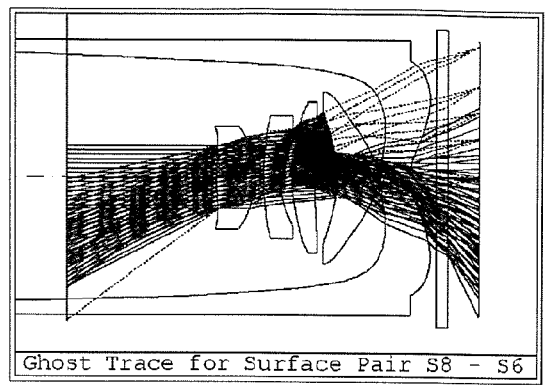
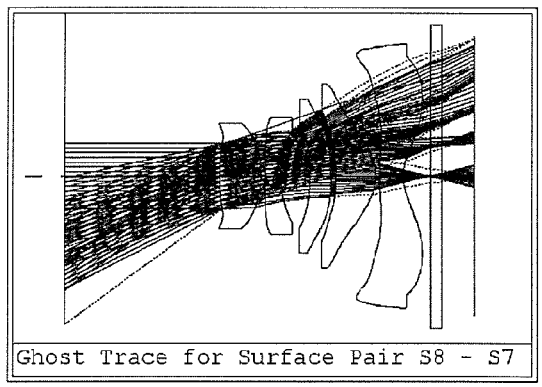
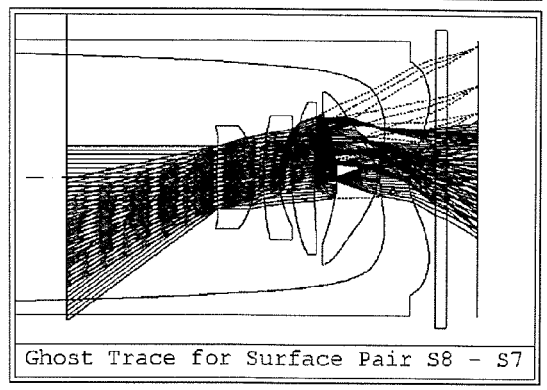
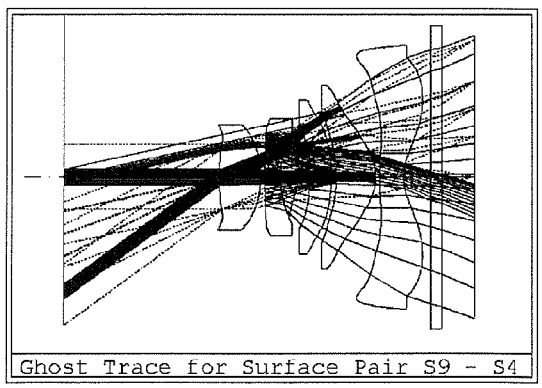
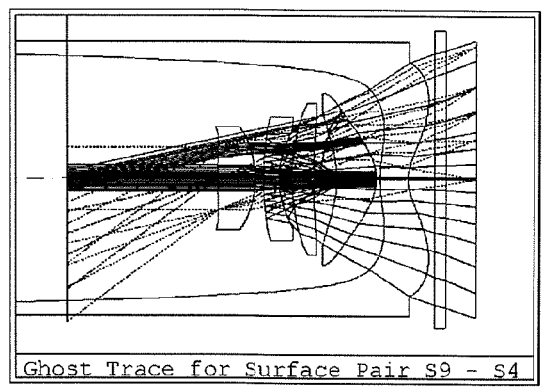

IMAGING LENS

CROSS-REFERENCE TO RELATED APPLICATIONS

This application is a continuation of U.S. patent application Ser. No. 12/854,428, filed Aug. 11, 2010, which claims the benefit under 35 U.S.C. §119 of Korean Patent Application No. 10-2009-0073715, filed on Aug. 11, 2009, which are hereby incorporated by reference in their entirety.

BACKGROUND

1. Field of the Invention

The present invention relates to an imaging lens.

2. Description of the Related Art

Regarding an image pick-up system, there have been recent researches into mobile terminal used camera modules, DSCs (Digital Still Camera), camcorders, PC cameras (imaging lens attached personal computers), etc. The most important component to obtain an image for such an image pick-up system-related camera module is an imaging lens that produces images.

Attempts to construct an imaging lens of high resolution using 5 pieces of lenses have been previously made. Each of the five pieces of lenses is comprised of lenses with positive (+) refractive force and lenses with negative (−) refractive force. For example, the imaging lens is constructed with PNNPN (+−−+−), PNPNN (+−+−−) or PPNPN (++−+−) orderly from an object side. However, an image module of the above-mentioned structure, in some cases, fails to show satisfactory optical properties or aberration properties, and thus a high resolution imaging lens having a new power structure is required.

BRIEF SUMMARY

The present invention provides an imaging lens having a new power structure, in particular provides an imaging lens configured to reduce a flare phenomenon, characteristically decrease the sensitivity and have a superior aberration property.

An imaging lens according to an embodiment of the present invention includes, in order from an object side, a first lens having positive (+) refractive force; a second lens having negative (−) refractive force; a third lens having positive (+) refractive force; a fourth lens having positive (+) refractive force; and a fifth lens having a negative (−) refractive force, wherein the third lens is convexly formed at the surface of the object side.

In an imaging lens according to the present embodiment, a certain lens is formed in which the first lens, the third lens and the fourth lens have positive (+) power, and the second lens and the fifth lens have negative (−) power, that is, providing an imaging lens of PNPPN power structure.

Also, the third lens is convexly formed at the surface of an object side possibly to realize an imaging lens where the aberration property is superior, a flare phenomenon decreases and the sensitivity is reduced.

BRIEF DESCRIPTION OF THE DRAWINGS

FIGS. 3A and 3B are graphs showing a coma-aberration according to one embodiment of the present invention;

FIGS. 5a and 5b are graphs showing a flare phenomenon decreasing property according to the present embodiment.

DETAILED DESCRIPTION

Figure 1:
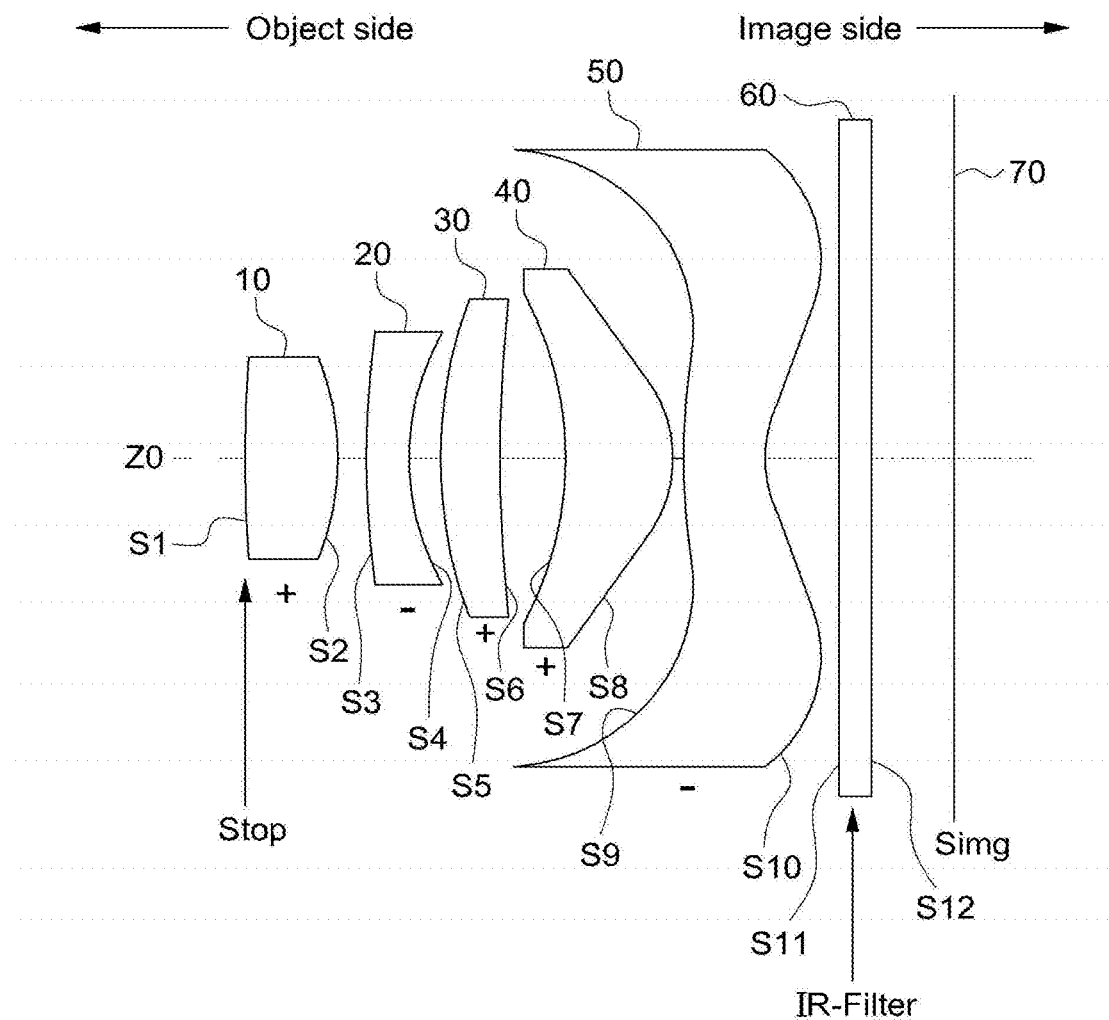
FIG. 1 is a construction view of an imaging lens according to the present embodiment.

Since various changes can be made to the present invention and various kinds of embodiments can be implemented, specific embodiments will be illustrated in the drawings and intended to be described in the detailed description in detail. However, it should not be appreciated in a limiting sense of limiting the present invention to a specific practice but to include all the changes, equivalents and replacements which fall in the spirit and technological scope of the present invention.

Stated that any component "is connected" or "is conjunctive" to another component, it will be appreciated to be directly connected or conjunctive to the very another component or that there exists the other component in the middle.

In the following, referring to attached drawings a preferred embodiment according to the present invention will be described in detail, but without regard to a drawing sign an identical or corresponding component is assigned the same reference numeral and a redundant description of this will be omitted.

FIG. 1 is a construction view according to the present embodiment, and is particularly a lateral construction diagram exemplifying the disposition state of a lens in an optic axis (ZO) center. In the construction view of FIG. 1, the thickness, size and shape of a lens have been somewhat exaggerated for description, and a spherical or aspheric shape is only presented as one embodiment not limiting to such shapes.

Referring to FIG. 1, a camera lens module of the present invention has a construction disposed of a first lens 10, a second lens 20, a third lens 30, a fourth lens 40, a fifth lens 50, a filter 60 and a light-receiving device 70 orderly from the object side.

Light corresponding to image information of a subject passes through the first lens 10, the second lens 20, the third lens 30, the fourth lens 40, the fifth lens 50 and the filter 60 and is incident on the light-receiving device 70.

Hereinafter in the description of the construction of each lens, "Object side surface" means the surface of a lens facing an object side with respect to an optical axis, and "Image side surface" means the surface of the lens facing an imaging surface with respect to the optical axis.

The first lens 10 has positive (+) refractive force, and there is the object side surface S1 convexly formed. The object side surface S1 of the first lens 10 may act as an aperture, and in this case, an imaging lens of the present embodiment does not need a separate aperture. The second lens has negative (−) refractive force, and there is the object side surface S3 convexly formed.

In the third lens 30, the fourth lens 40 and the fifth lens 50, the object side surface and the image side surface are all comprised of an aspheric. (That is, each of object side planes and image side planes in the third lens, the fourth lens and the fifth lens is of aspheric plane.) And, the third lens 30 and the fourth lens 40 have positive (+) refractive force, and the fifth lens has negative (−) refractive force.

As shown in the figure, the third lens 30 is a meniscus form where the object side surface S5 is convexly formed. And, the refractive force of the third lens 30 is formed smaller than the refractive force of the remaining lenses. The object side surface S5 of the third lens 30 is convexly formed, so that as a result a flare phenomenon spreading images decreases and the sensitivity of a lens is reduced.

The fourth lens 40 is a meniscus form in which the object side surface S7 is concavely formed, and the fifth lens 50 is a meniscus form where the object side surface S9 is convexly formed.

Here, the fifth lens 50 is an aspheric shape in which the double-sides of the object side surface S9 and the image side surface S10 all have an inflection point. As shown in the figure, the image side surface S10 of the fifth lens 50 bends towards the image side as proceeding from a central part centering an optical axis ZO to the peripheral and again bends to the object side as proceeding from the peripheral part away from the optical axis ZO to the outermost angle region, so as to form an aspheric inflection point.

An aspheric inflection point formed in the fifth lens 50 may adjust the maximum emergence angle of key light incident on a light-receiving device 70. And, an aspheric inflection point formed in the object side surface S9 and the image side surface S10 of the fifth lens 40 adjusts the maximum emergence angle of key light, thereby preventing the shading of the screen's surrounding part.

The filter 60 is at least one filter of optical filters such as an infrared filter and a cover glass. As a filter 60, in the application of the infrared filter, it blocks radiant heat emitting from external light from being transferred to the light-receiving device 70. Also, the infrared filter transmits visible light and reflects infrared rays to output it to the outside.

The light-receiving device 70 is an image sensor, for example, CCD (Charge Coupled Device) or CMOS (Complementary Metal Oxide Semiconductor), etc.

The first lens 10, the second lens 20, the third lens 30, the fourth lens 40 and the fifth lens 50 uses an aspheric lens as later described in embodiments, possibly improving the resolution of a lens and having a good point of superior aberration property.

Because the later described conditional expressions and embodiments are preferred embodiments raising the effect of interaction, it would be obvious to those skilled in the art that the present invention is not necessarily comprised of the following conditions. For example, only by gratifying some conditions of later described conditional expressions, the lens construction of the present invention may have a raised effect of interaction.

[Condition 1] $3<L1R1<7$
[Condition 2] $L3R1>1$
[Condition 3] $L3R2>1$
[Condition 4] $0.5<f1/f<1.5$
[Condition 5] $0.5<T/f<1.5$
[Condition 6] $1.6<N2<1.7$
[Condition 7] $1.5<N1, N3, N4, N5<1.6$
[Condition 8] $20<V2<30$
[Condition 9] $50<V1, V3, V4, V5<60$ Herein, L1R1: the object side surface radius of the first lens
L3R1: the object side surface radius of the third lens
L3R2: the imaging side surface of the third lens
f: the entire focus distance of the imaging lens
f1: the focus distance of the first lens
T: the distance from the object side surface to the on-focus surface of the first lens
N1~N5: the refractive index of the first lens~the fifth lens
V1~V5: Abbe's number of the first lens~the fifth lens Condition 1 specifies the curvature radius at the object side surface S1 of the first lens 10, Conditions 2 and 3 specify the double-side curvature radius of the third lens 30. The specification of the curvature radius is conditions on a lens's shape, and this is for the compensation of coma aberration and astigmatism and reducing the manufacturing tolerance.

Condition 4 specifies the refractive force of the first lens 10. The first lens 10 has refractive force with appropriate chromatic aberration and the pertinent compensation of spherical aberration by Condition 4. Condition 5 specifies the dimension of the optical axis direction of the entire optical system, and it is a condition for ultra-small lens and a condition for appropriate aberration compensation.

Conditions 6 and 7 specify refractive index of each lens, and Conditions 8 and 9 specify Abbe's number of each lens. The specification of refractive index and Abbe's number of each lens is a condition for better compensation of chromatic aberration.

Hereinafter, the action and effect of the present invention will be described with reference to a specific embodiment. Aspheric mentioned in a later embodiment is obtained from a known Equation 1, and 'E and its succeeding number' used in Conic constant k and aspheric coefficient A, B, C, D, E, F indicates 10's power. For example, E+01 denotes $10^1$, and E-02 denotes $10^{-2}$.

$$z = \frac{cY^2}{1+\sqrt{1-(1+K)c^2Y^2}} + AY^4 + BY^4 + CY^4 + DY^4 + EY^4 + FY^4 + \ldots \quad \text{Equation 1}$$

Herein, z: Distance from the lens's top-point to an optical axis direction
c: Basic curvature of a lens
Y: Distance towards a direction perpendicular to an optical axis
K: Conic constant
A, B, C, D, E, F: Aspheric coefficient

WORKING EXAMPLE

TABLE 1

|  | Work example |
|---|---|
| f | 4.75 |
| f1 | 4.04 |
| f2 | −4.55 |
| f3 | 9.58 |
| f4 | 3.13 |
| f5 | −3.23 |
| f1/f | 0.85 |
| T | 6.73 |
| T/f | 1.42 |
| N1 | 1.533 |
| V1 | 56.5 |
| N2 | 1.62 |
| V2 | 26 |
| N3, N4, N5 | 1.533 |
| V3, V4, V5 | 56.5 |
| L1R1 | 5.60 |
| L3R1 | 3.20 |
| L3R2 | 8.00 |

Table 1 shows a work example matching the aforementioned conditional expressions.

Referring to Table 1, L1R1 is 5.60 that matches to Condition 1, and L3R1 is 3.20 and L3R2 is 8.00, respectively matching into Conditions 2 and 3. Also, f1/f is 0.85 that matches into Condition 4, and T/f is 1.42 showing a matching into Condition 5. Also, it can be seen that the refractive index N1~N5 of each lens matches Conditions 6 and 7, and Abbe's number V1~V5 of each lens matches Conditions 8 and 9.

TABLE 2

| Surface Number | Curvature Radius (R) | Thickness or Distance (d) | Refractive Index (N) |
|---|---|---|---|
| 1* | 5.6 | 0.9 | 1.53 |
| 2* | -3.5 | 0.27 | |
| 3* | 9.4 | 0.40 | 1.61 |
| 4* | 2.1 | 0.30 | |
| 5* | 3.2 | 0.55 | 1.53 |
| 6* | 8.0 | 0.62 | |
| 7* | -2.8 | 1.0 | 1.53 |
| 8* | -1.2 | 0.1 | |
| 9* | 3.4 | 0.78 | 1.53 |
| 10* | 1.1 | 0.70 | |
| 11 | | 0.3 | 1.52 |
| 12 | | 0.80 | |
| image | | 0.01 | |

In the above Table 2, the notation * which is further written near the surface number indicates aspheric.

The embodiment of Table 2 shows a more specific embodiment than Table 1's embodiment.

And, the aspheric coefficient values of each lens in the embodiment of Table 2 are as in the following table 3.

TABLE 3

| Surface Number | k | A | B | C | D | E | F |
|---|---|---|---|---|---|---|---|
| 1* | 0 | -0.278840E-01 | -0.115063E-01 | -0.314565E-02 | 0.436500E-02 | -0.364702E-02 | 0 |
| 2* | 0 | -0.691104E-02 | -0.212701E-01 | 0.124050E-01 | -0.861190E-02 | 0.297906E-02 | 0 |
| 3* | 0 | -0.193793E-01 | 0.103822E-01 | -0.133796E-02 | -0.148393E-02 | 0.104056E-02 | 0 |
| 4* | -4.310108 | -0.198769E-01 | 0.309275E-01 | -0.153250E-01 | 0.316803E-02 | -0.164905E-04 | 0 |
| 5* | 0 | -0.508923E-01 | 0.134434E-01 | -0.118161E-02 | 0 | 0 | 0 |
| 6* | 0 | -0.184251E-01 | 0.197696E-02 | 0.142627E-03 | 0 | 0 | 0 |
| 7* | -8.536520 | -0.287370E-01 | 0.202006E-01 | -0.841387E-02 | 0.244085E-02 | -0.357293E-03 | 0 |
| 8* | -1.771588 | 0.303330E-01 | -0.176527E-01 | 0.367535E-02 | 0.161459E-03 | -0.760293E-04 | 0 |
| 9* | -53.45174 | -0.127200E-02 | -0.878231E-02 | 0.148096E-02 | -0.792305E-05 | -0.165005E-04 | 0.915831E-06 |
| 10* | -5.030395 | -0.213867E-01 | 0.309764E-02 | -0.604438E-03 | 0.690919E-04 | -0.372236E-05 | 0.467587E-07 |

Figure 2:
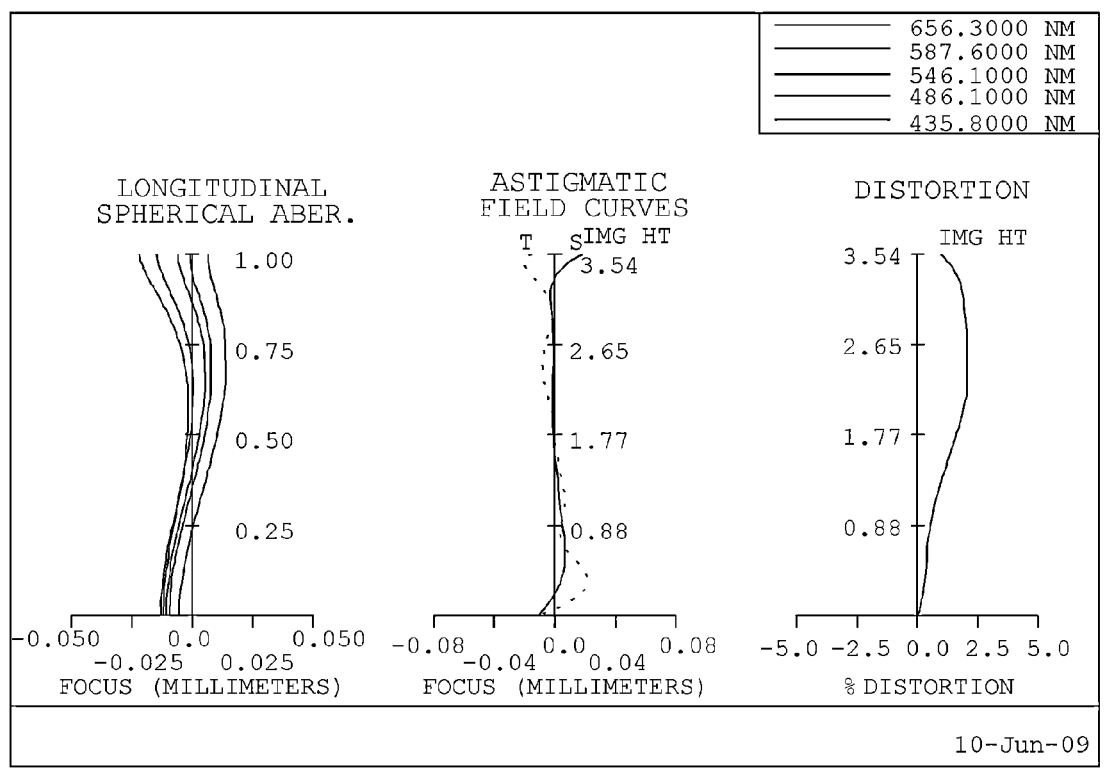
FIG. 2 is a graph showing an aberration property according to one embodiment of the present invention.

FIG. 2 is a graph showing an aberration view according to the aforementioned embodiment, in particular a graph measuring a longitudinal spherical aberration, astigmatic field curves and a distortion in order from the left.

In FIG. 2, the Y axis means the image size, and the X axis means the focus distance (mm unit) and the distortion rate (% unit). In FIG. 2, as the curves approach the Y axis, an aberration compensation function is interpreted to be good. In the shown aberration view, images' values on almost all the fields appear adjacent to the Y axis, so that the longitudinal spherical aberration, the astigmatic field curves and the distortion all show superior numerical values.

Figure 3B:
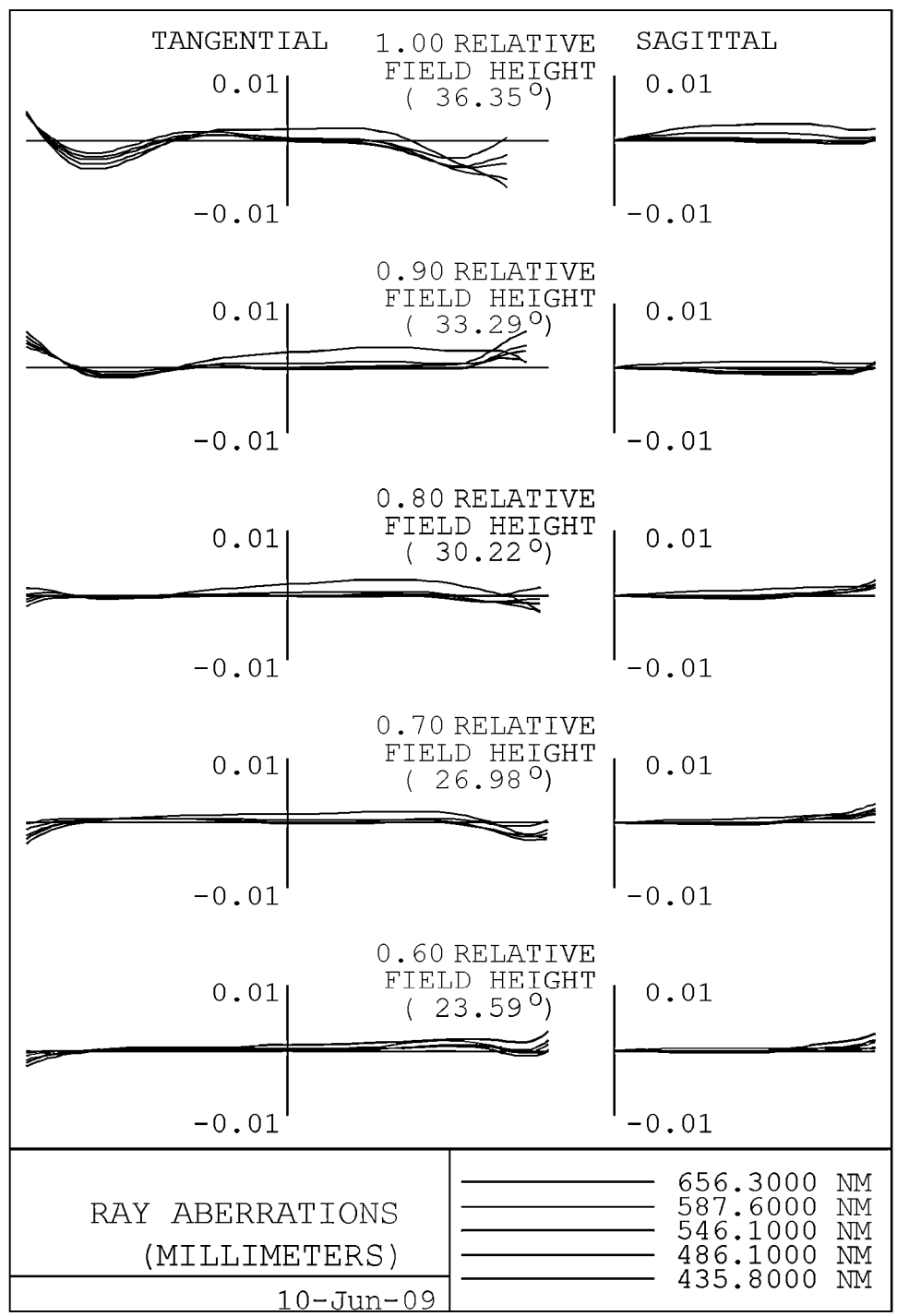

FIG. 3 is a graph measuring Coma aberration, and FIGS. 3(a) and 3(b) is a graph measuring tangential aberration and sagittal aberration of each wavelength according to a field height. In FIG. 3, In FIG. 3, as a graph showing a test result approaches the X axis from the positive axis and the negative axis each, a coma aberration compensation function is interpreted to be good. In the FIG. 3's measurement examples, image values on almost all the fields appear adjacent to the X axis, so that all of them are analyzed to show a superior coma aberration compensation function.

Figure 4:
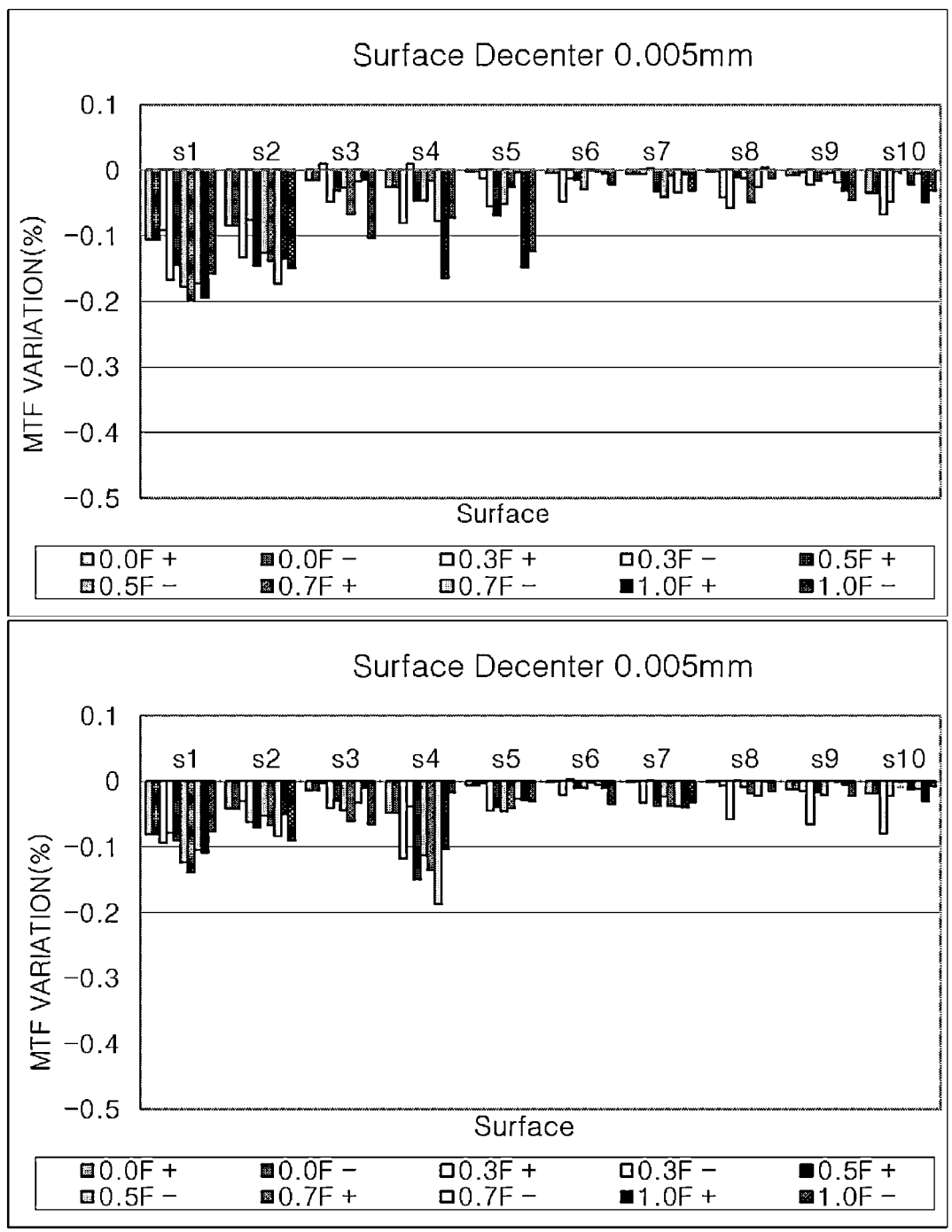
FIG. 4 is a graph showing a sensitivity decrease property according to the present embodiment.

FIG. 4 is a graph showing a sensitivity decrease feature as a result of the present embodiment, and FIGS. 5a-5b show a flare phenomenon reduction feature according to the present embodiment. In FIG. 4 and FIGS. 5a-5b, to show the sensitivity decrease and the reduction of a flare phenomenon by bulgingly forming the object side surface S5 of the third lens 30 in the present invention, a case of concavely forming the object side surface S5 of the third lens 30 and a case of convexly forming the same are exemplified in comparison to each other.

FIG. 4a shows a tolerance analysis in a lens plane when the object side S5 of the third lens 30 is concave, and FIG. 4b shows a tolerance analysis in the lens plane when the object side S5 of the third lens 30 is convex. Comparing the two views, it can be known that the change in resolution (MTF; Modulation Transfer Function) at FIG. 4b is smaller than FIG. 4a. That is, when the third lens 30 has a meniscus form in which the object side surface S5 is convex, it clearly causes the further decrease of its sensitivity than in a concave form of the object side surface of the third lens 30.

FIG. 5a shows an example of ray distribution in an image sensor where the object side surface S5 of the third lens 30 is concave, and FIG. 5b shows an example of ray distribution in the image sensor when the object side surface S5 of the third lens 30 is convex. Comparing the two views, the ray distribution at FIG. 5b is well dispersed than in FIG. 5a, and thus, to be sure, a ghost phenomenon or a flare phenomenon, in which an image non-existent in a subject is formed when the object side surface of the third lens 30 is in a convex shape like the present invention, is greatly decreased.

While the embodiments of the present invention has been explained in detail at the foregoing part, the rights scope of the present invention is not limited to the embodiment and various modifications and substitutions thereto by those skilled in the art using the basic concept of the present invention as defined in the accompanying claims will fall in the rights scope of the invention.

What is claimed is:

1. An imaging lens system, comprising five lenses, in an order from an object side to an image side:
   a first lens having positive (+) refractive power;
   a second lens having negative (-) refractive power;
   a third lens having positive (+) refractive power which is different from the refractive power of the second lens;
   a fourth lens having positive (+) refractive power; and
   a fifth lens having refractive power, wherein an object-side surface of the fourth lens is concavely formed at an optical axis, and both surfaces of the fifth lens are aspheric;
   wherein the refractive power of the third lens is smaller than that of the first, second, fourth, or fifth lens.

2. The imaging lens system as claimed in claim 1, wherein each of the object-side surfaces and the image-side surfaces of the third lens and the fourth lens is aspheric.

3. The imaging lens system as claimed in claim 1, wherein an object-side surface of the third lens is convexly formed at the optical axis.

4. The imaging lens system as claimed in claim 1, wherein an image-side surface of the fifth lens is concavely formed at the optical axis.

5. The imaging lens system as claimed in claim 1, wherein the fifth lens has at least one inflection point.

6. The imaging lens system as claimed in claim 1, wherein the imaging lens system has a stop on an object-side surface of the first lens.

7. The imaging lens system as claimed in claim 1, wherein an image-side surface of the fourth lens is convexly formed at the optical axis.

8. The imaging lens system as claimed in claim 1, wherein the imaging lens system meets a conditional expression of $0.5<f1/f<1.5$, where an entire focus distance of the imaging lens system is f and a focus distance of the first lens is f1.

9. The imaging lens system as claimed in claim 1, wherein the imaging lens system meets a conditional expression of $0.5<T/f<1.5$, where an entire focus distance of the imaging lens system is f and a distance from the object-side surface of the first lens to an on-focus surface is T.

10. The imaging lens system as claimed in claim 1, wherein the imaging lens system meets a conditional expression of $1.6<N2<1.7$, where N2 is a refractive index of the second lens.

11. The imaging lens system as claimed in claim 1, wherein the imaging lens system meets a conditional expression of $20<V2<30$, where V2 is an Abbe's number of the second lens.

12. The imaging lens system as claimed in claim 1, wherein the third lens, the fourth lens, and the fifth lens each is a lens in a meniscus form.

13. An imaging lens system, comprising five lenses, in an order from an object side to an image side:
  a first lens having positive (+) refractive power;
  a second lens having negative (−) refractive power;
  a third lens having positive (+) refractive power which is different from the refractive power of the second lens;
  a fourth lens having positive (+) refractive power; and
  a fifth lens having a refractive power, wherein an object-side surface of the fourth lens is concavely formed at an optical axis, and both surfaces of the third lens are aspheric;
  wherein the refractive power of the third lens is smaller than that of the first, second, fourth, or fifth lens.

14. The imaging lens system as claimed in claim 13, wherein the imaging lens system meets a conditional expression of $0.5<f1/f<1.5$, where an entire focus distance of the imaging lens system is f and a focus distance of the first lens is f1.

15. The imaging lens system as claimed in claim 13, wherein the imaging lens system meets a conditional expression of $0.5<T/f<1.5$, where an entire focus distance of the imaging lens system is f and a distance from an object-side surface of the first lens to an on-focus surface is T.

16. The imaging lens system as claimed in claim 13, wherein the fifth lens has at least one inflection point.

17. A camera module comprising an imaging lens system and an image sensor:
  wherein the imaging lens system comprising five lenses, in an order from an object side to an image side:
  a first lens having positive (+) refractive power:
  a second lens having negative (−) refractive power;
  a third lens having positive (+) refractive power which is different from the refractive power of the second lens;
  a fourth lens having positive (+) refractive power; and
  a fifth lens having refractive power, wherein an object-side surface of the fourth lens is concavely formed at an optical axis, and both surfaces of the fifth lens are aspheric;
  wherein the refractive power of the third lens is smaller than that of the first, second, fourth, or fifth lens.

* * * * *